United States Patent [19]

Nijhuis

[11] 4,420,855
[45] Dec. 20, 1983

[54] SET OF ELECTRODES FOR AN APPARATUS FOR ELECTRICALLY STUNNING SLAUGHTER CATTLE

[75] Inventor: Gerrit J. Nijhuis, Winterswijk, Netherlands

[73] Assignee: Machinefabriek G.J. Nijhuis B.V., Winterswijk, Netherlands

[21] Appl. No.: 285,579

[22] Filed: Jul. 21, 1981

[30] Foreign Application Priority Data

Jul. 25, 1980 [NL] Netherlands ............... 8004289

[51] Int. Cl.³ ............................................. A22B 3/06
[52] U.S. Cl. ............................................. 17/1 E
[58] Field of Search ............................ 17/1 E

[56] References Cited

U.S. PATENT DOCUMENTS 1,857,658  5/1932  Pfretzschner ............ 17/1 E
1,935,138  11/1933  Windisch ................. 17/1 E
3,177,526  4/1965  Braun .................... 17/1 E X Primary Examiner—Willie G. Abercrombie
Attorney, Agent, or Firm—Arnold, White & Durkee

[57] ABSTRACT

The invention relates to a set of two electrodes for an apparatus for electrically stunning slaughter cattle, said electrodes extending downwardly and forwardly into the V-shaped passage between two endless conveyors, which electrodes (1) according to the invention have rounded lower edges (4) which smoothly merge into converging inner edges (5) which through a reverse bending (6) merge into a straight portion (7) said electrodes being preferably made from a flat plate shaped such that its angle with respect to a reference plane (9) from top to bottom increases and decreases while its distance to a reference plane (9) for the outer edge (3) remains equal in the first one third part of the length then decreases slightly, increases in the center range and decreases again such that said two electrodes can engage the animals head like thumb free finger closed hands.

4 Claims, 4 Drawing Figures

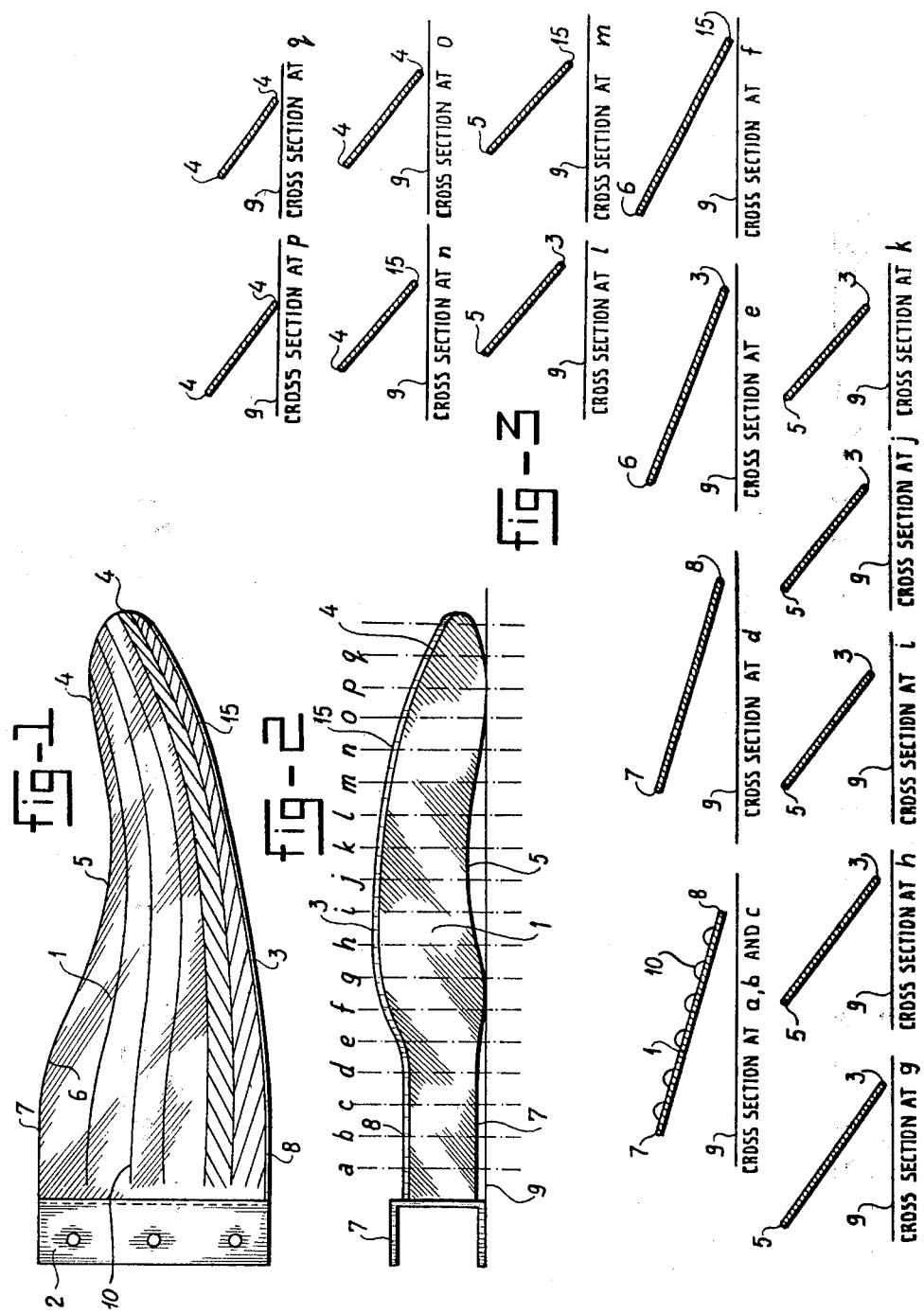

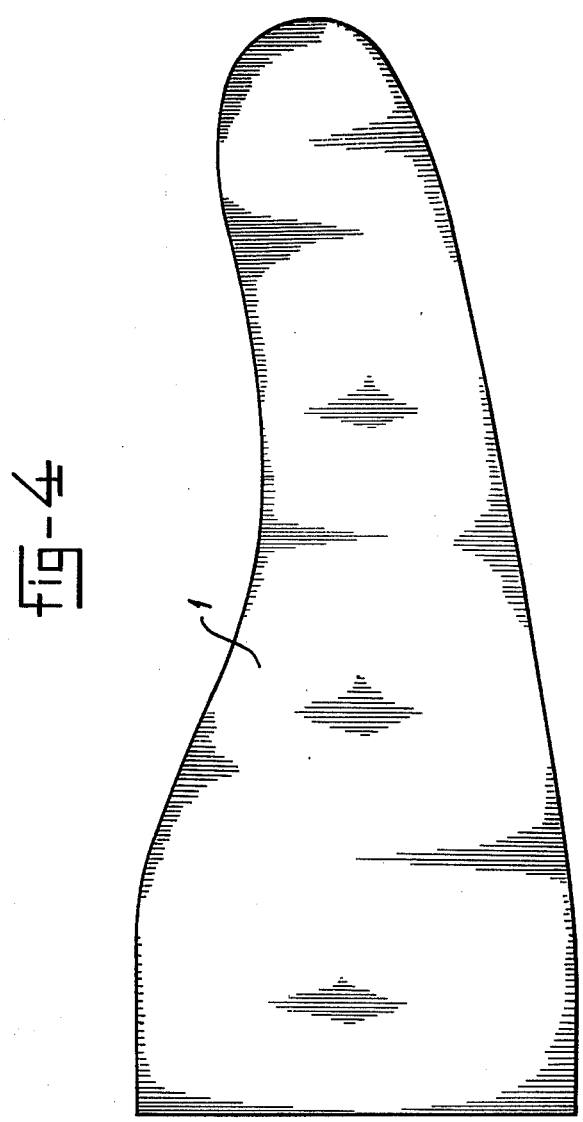

SET OF ELECTRODES FOR AN APPARATUS FOR ELECTRICALLY STUNNING SLAUGHTER CATTLE

The invention relates to two electrodes forming each other's mirror image for an apparatus for electrically stunning slaughter cattle, said electrodes being located between the operating surfaces of two endless conveyors defining a V-shaped passage and running synchronously and in parallel relationship to each other, said electrodes being arranged side by side, being pivotable around a horizontal traverse axis lying above the conveyors and each comprising a plate the outer edges of which extending substantially parallel to and in closed relationship along the operating surfaces of the conveyors and of which the edges facing each other diverge in upward direction from the under ends and merge through a curvature into edges converging to each other, said electrodes viewed in the direction of conveyance being directed slantingly downwards and frontwards from above with the inner edges with respect to the outer edges directed frontwards from beneath and subsequently running back again such that in the center portion viewed in the direction of advance a V-shaped position of the operating surfaces of the electrodes is obtained.

A device with such a set of electrodes is proposed in the Netherlands patent application No. 7904935 not prepublished. In the apparatus according to said older proposition the electrodes have horizontal under edges merging through an angle in the outer edges and inner edges respectively, said inner edges are straight except of the curvature between the diverging edge portion and the converging edge portion while also the outer edges are straight.

It appeared that during stunning said electrodes leave traces on the skin of the animal which is undesirable.

The invention has the object to give the electrodes such a shape that said disadvantage does not occur anymore and an optimal contact with the animal to be stunned is secured yet.

According to the invention, said object is obtained by rounding off the under edges of the electrodes, said rounding-off leads smoothly to the outer edges on the diverging portion and on said curvature and said latter merges smoothly into the converging edge portion having a reverse bending in upward direction. By the rounding-off one does not only obtain that the electrodes do not leave traces on the back portion of the animal anymore, but one achieves also that after contact with the electrodes, in which the head of the animal may adopt different positions and thereby may contact the one electrode earlier than the other, the smoothly curved edges of the plate electrodes directed slantingly frontwards serve an excellent contact without leaving traces.

Preferably such an electrode is made from a flat plate being already provided with the necessary above mentioned rounding-off. In order to obtain an optimal contact with the head of the animal in the older proposition, it was already proposed to take care that viewed in the direction of conveyance the surfaces of the electrodes are directed frontwards in a V-shape. Said V-shape in combination with the electrodes protruding slantingly downwards from above into the passage ensures that the electrode surfaces inclining into directions can abut well against the snout of the animal.

Now, the invention in combination with the rounding-off provides also an adapted V-shaped profile of the two plate electrodes with respect to each other, because each electrode plate is rectilinear in each cross-section in a plane parallel to its pivot axis and said rectilinear section with respect to the reference plane parallel to the pivot axis makes an angle with the plane, said angle viewed from above, over approximately a third of the length of each electrode, increases from a small angle upto an angle of approximately 45°, over the center range, i.e. the range with the curvature of the inner edge lying between diverging and converging portion, remains nearly equal and thereafter decreases slightly again and the distance of the outer edge of each electrode from the reference plane parallel to the pivot axis remains first equal in the first one third part of the length, decreases slightly thereafter and increases in the center range, said distance decreases in the final portion again, the angle of inclination of which decreases also again.

So, over the entire height the electrodes form a V-shaped passage in the direction of conveyance, which is wide open in the upper portion, becomes slightly sharper subsequently and thereafter opens slightly again and which by its alternating distance of the outer edge from the reference plane parallel to or through the pivot axis exhibits also a slight curvature directed frontwards if one views along the electrode from above to the point.

Said three dimensional shape can be realized in a simple way from a flat plate. However, manufacturing by moulding is well possible as well.

The opening formed between the electrode plates when they are in a condition of rest and thus, formed by the curvatures of the inner edges, represents a slightly lens-shaped aperture.

One can compare such electrodes for the best with two big thumbfree hands which with their natural curvature grip around the snout of the animal from above, i.e. over the two sides.

According to the invention the rear surface of the electrodes, i.e. the surface coming in contact with the animal to be stunned can be provided with ridges or similar raisings.

Said ridges increase the contact pressure of the electrodes onto the animal. The passage of current is improved then and this can result in lowering the stunning voltage.

Preferrable the ridges extend in the direction in which they brush past the head of the animal. However, other diections are also conceivable. In manufacturing as casting the ridges give no problems.

In manufacturing from a plate one can provide them in form of weld beads.

Now, the invention will be explained by reference to the drawings.

FIG. 1 shows an electrode in rear view.

FIG. 2 is a side view of the electrode of FIG. 1.

FIG. 3 shows seventeen different cross-sections of FIG. 2.

FIG. 4 shows a flat development of the plate from which an electrode can be made.

For both of the electrodes one may use the same plate 1 as shown in FIG. 1 and FIG. 4, in which the plate of FIG. 1 is already formed corresponding to a desired profile of an electrode at the left in the V-shaped passage viewed in the direction of conveyance. Said plate is fixed by means of welding to a U-shaped portion 2, being fixed on a pivot shaft with means not shown.

The outer edge 3 of the plate is nearly rectilinear over the greatest part of its length but merges smoothly into the curved point 4 in the final third portion and that through a curvature 15 having a very weak bending initially. The curved point 4 merges smoothly into the curvature 5 leading smoothly to a reverse bending 6 merging smoothly into a straight portion 7 located opposite of the straight portion 8 of the outer edge.

In FIG. 2 a reference plane 9 is shown being parallel to the axis of rotation in the center of the U-shaped portion 2.

By the lines a up to and including q cross-section surfaces are indicated extending perpendicular to the reference surface 9.

In the different FIGS. 3 the sections of the plate 1 are shown with respect to the reference plane 9.

In the first two figures relating to the sections a, b, c and d the distances of the outer edge 8 from the reference surface are equal as well as the distances of the inner edge 7. In the section e the inner edge is slightly closer to the reference plane 9 and this continues up to the section g.

The inner edge 6 has a larger distance from the reference surface 9, in which the distance at the curvature 5 as shown in the sections g, h and i remains nearly equal over said portion and decreases again thereafter. However, at the same time the distance of the outer edge from the reference plane has become larger which continues up to the section k, whereafter also said distance becomes smaller again.

The different sections a up to and including q show clearly the trend of the angle of inclination and the variation of the distance from the reference plane and give in this way in combination with the drawn curvatures a picture of the profile.

In FIG. 1 and FIG. 3 *a, b, c* by the lines 10 ridges are indicated extending in the direction of passing and may consist of weld beads, ground or not.

I claim:

1. Electrodes for stunning an animal without leaving trace on the animal hide, comprising:
    a first electrode and a second electrode, the second electrode being generally shaped in a mirror image of the first electrode, said electrodes being located between the operating surfaces of two endless conveyors defining a V-shaped passage and running synchronously and in parallel relationship to each other, said electrodes being arranged side by side pivotably around a horizontal transverse axis lying above the conveyors and each comprising a plate the outer edges of which extend substantially parallel to and in close relationship along the operating surfaces of the conveyors and of which the edges facing to each other diverge in upward directions from the under ends and through a curvature merge into edges converging to each other, said electrodes viewed in the direction of conveyance being directed slantingly downwards and frontwards from above with the inner edges directed further frontwards from beneath with respect to the outer edges and subsequently run back again such that in the center portion viewed in the direction of advance a V-shaped position of the operating surfaces of the electrodes is obtained, the under edges of the electrodes being rounded off, which rounding-off leads smoothly to the outer edges on the diverging portion and on said curvature and said diverging portion merges smoothly into the converging edge portion having a reverse bending upwards.

2. The electrodes according to claim 1, wherein each electrode plate in each cross-section in a plane parallel to its pivot axis is rectilinear and said rectilinear cross-section, with respect to a reference plane parallel to the pivot axis, makes an angle with the plane, which view from above,
    over approximately a third of the length of each electrode increases from a small angle to an angle of approximately 45°,
    over a center range where the curvature of the inner edge lies between the diverging and converging portion, remains nearly equal to 45°, and
    over the remaining length decreases slightly again and
    the distance of the outer edge of each electrode from the reference plane parallel to the pivot axis remains equal in the first one third part of the length,
    the distance decreases slightly thereafter,
    the distance increases in the center range, and
    said distance decreases again in the final portion.

3. The electrodes according to claim 1 or claim 2, wherein the rear surface of the electrodes coming in contact with the animal to be stunned is provided with ridges.

4. The electrodes according to claim 3, wherein said ridges extend in the direction in which the head of the animal brushes past the electrodes.

* * * * *